United States Patent [19]

Ljung

[11] Patent Number: 4,585,346
[45] Date of Patent: Apr. 29, 1986

[54] PATHLENGTH CONTROLLER FOR THREE-AXIS RING LASER GYROSCOPE ASSEMBLY

[75] Inventor: Bo H. G. Ljung, Wayne, N.J.

[73] Assignee: The Singer Company, Little Falls, N.J.

[21] Appl. No.: 476,447

[22] Filed: Mar. 17, 1983

[51] Int. Cl.⁴ .............................................. G01C 19/64
[52] U.S. Cl. .................................................... 356/350
[58] Field of Search ......................................... 356/350

[56] References Cited

U.S. PATENT DOCUMENTS 4,152,071 5/1979 Podgorski .......................... 356/350
4,477,188 10/1984 Stiles et al. ......................... 356/350

Primary Examiner—Vincent P. McGraw
Attorney, Agent, or Firm—Thomas W. Kennedy

[57] ABSTRACT

A pathlength controller is provided for a three-axis, cube-shaped ring laser gyroscope assembly having three four-sided gyroscopes with six mirrors, including three movable mirrors and three fixed mirrors, wherein the controller connects between the three movable mirrors and the three fixed mirrors, and is adapted to change the pathlength of one gyroscope without changing the pathlengths of the other two gyroscopes.

6 Claims, 4 Drawing Figures

PATHLENGTH CONTROLLER FOR THREE-AXIS RING LASER GYROSCOPE ASSEMBLY

FIELD OF INVENTION

The present invention relates to a pathlength controller for a three-axis ring laser gyro assembly having three gyroscopes with six mirrors.

PRIOR ART STATEMENT

U.S. application Ser. No. 368,797, which is assigned to the same assignee as this application, describes a cube-shaped, three-axis, ring laser gyro assembly having three gyroscopes with six mirrors, including three movable mirrors and three fixed mirrors.

U.S. Pat. No. 4,160,184, which is assigned to the same assignee as this invention, describes a piezoelectric actuator for a pathlength controller of a single ring laser gyroscope.

U.S. Pat. No. 4,267,478, which is assigned to the same assignee as this invention, describes a pathlength controller for a single ring laser gyroscope.

U.S. Pat. No. 4,320,974, which is also assigned to the same assignee as this invention, also describes a pathlength controller for a single ring gyroscope.

PRIOR ART DESCRIPTION

The abovedescribed, prior art, cube-shaped, three-axis, gyro cluster for detecting inertial rotation about three axis includes, a cube body, a mirror located at the center of each cube body face, bores formed internally of the body between each mirror and each of four adjacent mirrors thereby forming optical cavities therebetween containing lasing gas, three mutually orthogonal planes passing through the mirrors, each plane including an optical cavity enclosing a closed beam path orthogonal to the other beam paths, a passageway filled with lasing gas located in the body coaxial with a diagonal through the body of the cube, at least one cathode affixed to the body and extending outwardly from an end point of the diagonal passageway, spring means attached to the body for permitting dithering of the body, a plurality of anodes located in each beam path, and shortened passageways filled with lasing gas and connecting the diagonal passageway with each of the beam paths for communicating electrical energy from the cathodes to the anodes.

The abovedescribed, prior art pathlength controller design uses three controllers for the three gyroscopes, which have nine mirrors. Each controller would control its own gyroscope pathlength only.

One problem with the prior art controller, as shown in the aforementioned U.S. patents, is that there is a separate circuit for each ring laser gyroscope, which only senses the pathlength of its gyroscope, and which only changes the pathlength of its gyroscope.

If the prior art controller is used in the abovedescribed cube-shaped, three-axis, gyro cluster having three gyroscopes with six mirrors, including three movable mirrors and three fixed mirrors, a change in pathlength of any one gyroscope would change the pathlengths of one of the other gyroscopes.

SUMMARY OF THE INVENTION

According to the present invention, the abovedescribed problem is overcome by using a controller, which is shared by the three movable mirrors, and which can adjust the pathlength of any one gyroscope, but which does not change the pathlength of the other two gyroscopes. The controller, according to the invention, includes, detector assemblies, which connects to the three fixed mirrors, an input matrix assembly, which connects to the detector assembly, and a high voltage amplifier assembly, which connects to the input matrix assembly and which connects to the three movable mirrors. Further, the input matrix assembly comprises three sets of identical parts for ease of manufacture.

The above-mentioned objects and advantages of the present invention will be more clearly understood when considered in conjunction with the accompanying drawings.

DESCRIPTION OF THE INVENTION

Figure 1:
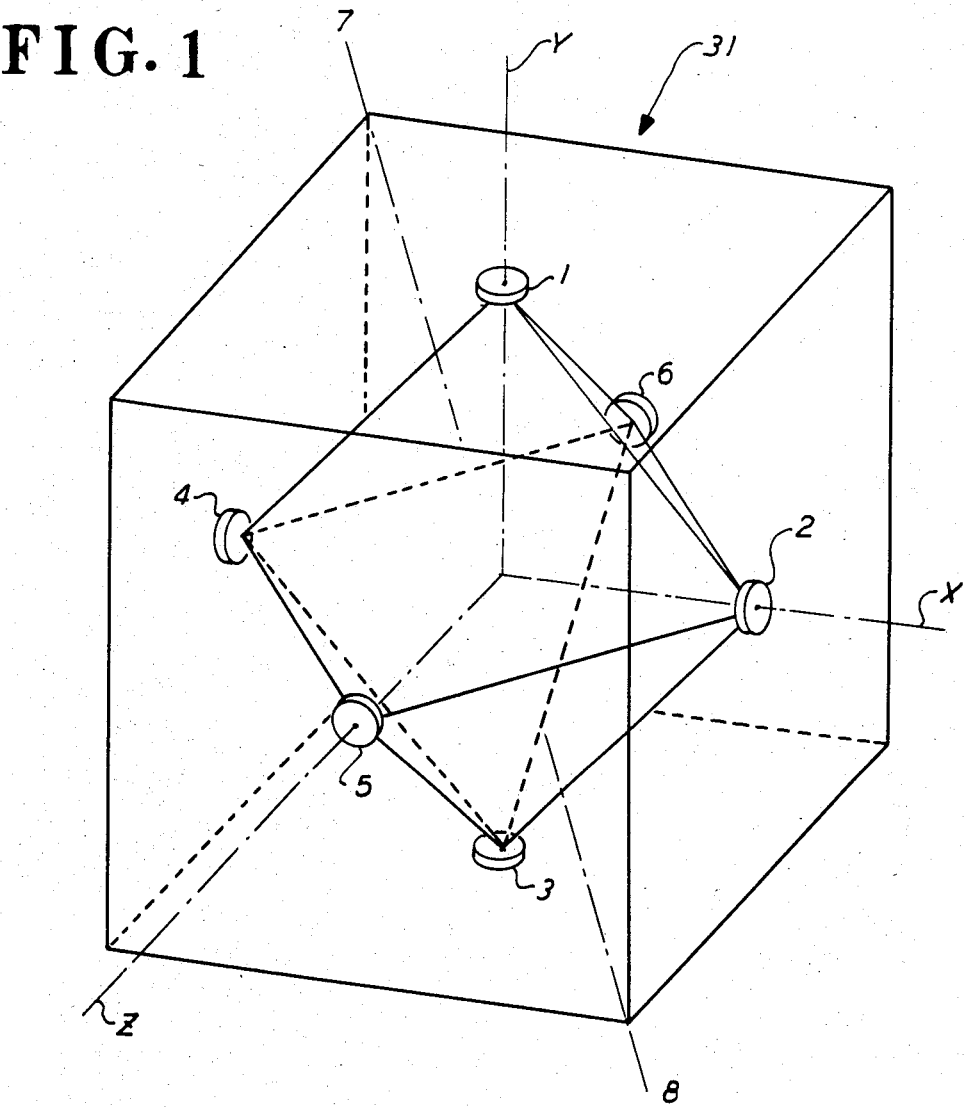
FIG. 1 is a schematic illustration of the three axis ring laser gyroscope cluster.
Figure 3:
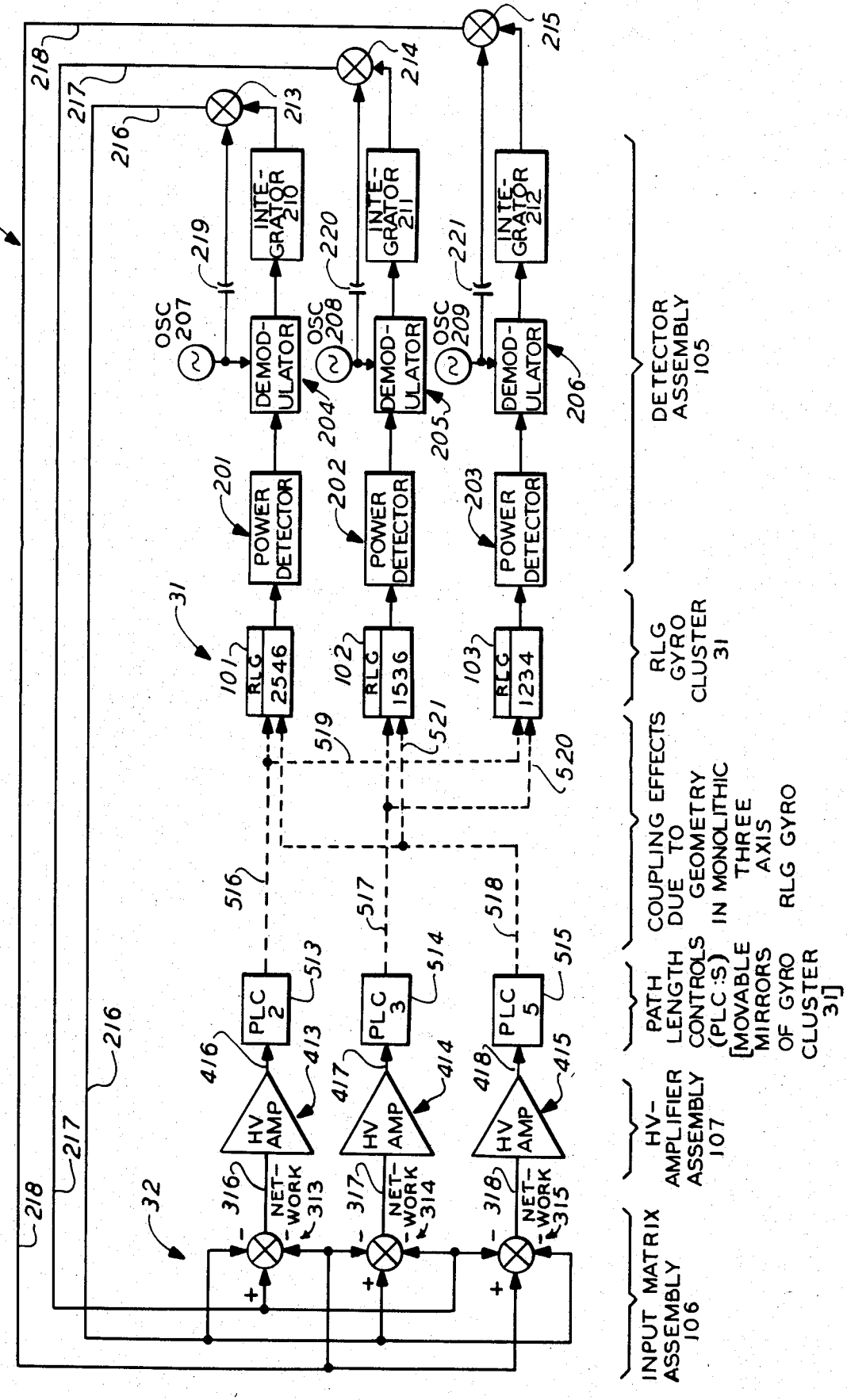
FIG. 3 is a circuit diagram of a controller according to the invention.

Referring to FIG. 1 and FIG. 3, a three axis gyro assembly 30 is shown. Gyro assembly 30 includes a gyro cluster 31 and a controller 32.

Referring to FIG. 1, a schematic illustration of the gyro cluster 31 is shown. Mirrors 1–6 are respectively positioned in the center of each cube body face. The cube is machined such that a small diameter bore connects adjacent mirrors as illustrated. A closed optical cavity is defined between four coplanar mirrors which are interconnected by bores. A total of three optical cavities are formed between the mirrors as follows: 2, 5, 4, 6; 1, 5, 3, 6; and 1, 2, 3, 4. The cavity defined by these bores is filled with a helium-neon gas mixture which causes lasing in response to electrical excitation to be discussed hereinafter.

In the configuration shown in FIG. 1, there are three mutually orthogonal beam paths, each of which serves to detect angular rotation about a separate axis. These beam paths may be defined by the optical cavities mentioned above between mirrors 2, 5, 4 and 6; 1, 5, 3 and 6; and 1, 2, 3 and 4. FIG. 1 illustrates the fact that each mirror is incorporated in the beam path of two orthogonal planes. Otherwise stated, each mirror is utilized for two orthogonal RLGs respectively associated with two separate axes.

With continued reference to FIG. 1, the bores existing between the mirrors define segments of the previously stated beam paths along which laser light travels. As is usual in RLGs, each RLG has laser light propagating in opposite directions. Any frequency difference in these two light waves represents an inertial rotation. In order to avoid the problems of the well-documented lock-in effect, the monolithic laser is dithered about an axis that is equally shared by the three RLGs. Dithering, which is an angular vibration imposed upon the body of the RLG is a well-accepted means of avoiding the lock-in effect. The dither axis of the structure shown in FIG. 1 is indicated between reference numerals 7 and 8.

Figure 2:
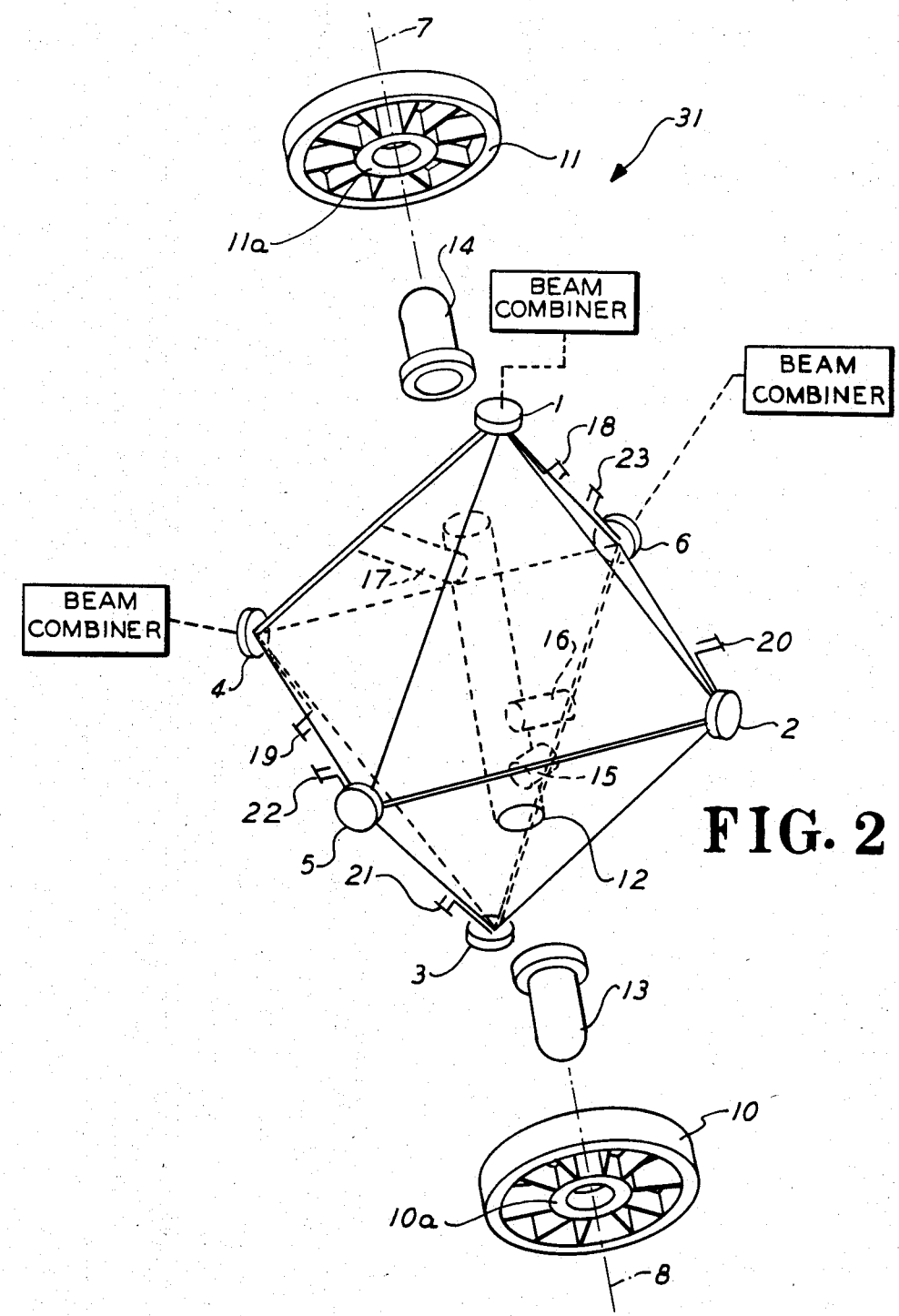
FIG. 2 is a schematic disassembled view of the ring laser gyroscope cluster including anodes, cathodes and spring suspension.

FIG. 2 illustrates how a dither spring suspension is arranged. Two dither springs 10 and 11 support the monolithic RLG on the axis 7, 8. These dither springs are well known in the prior art and incorporate a piezoelectric sensor and motor that is connected with a servo amplifier to dither the cube block about the axis 7, 8. The dithering suspension components are well documented in the prior art and will therefore not be elaborated upon herein. Each RLG portion of the invention, corresponding to one of the three beam paths, senses a large part of the dither angular rotation about the axis 7, 8 to a sufficient degree to prevent the lock-in effect.

Bore 12 is coaxially positioned along axis 7, 8. The cathodes 13 and 14 are fastened to corresponding faces of the cube body and in registry with the openings of bore 12. Each of the dither springs 10 and 11 have central annular openings 10a and 11a to facilitate attachment to the cube body. The outer rims of springs 10 and 11 are fixed while the monolithic RLG undergoes dithering motion.

Shortened bores 15, 16 and 17 permit communication between bore 12 and cathodes 13, 14 to each of the three RLG beam paths. Double lines are employed in FIG. 2 to indicate the plasma paths which are symmetrical with respect to the cathode bores 15, 16 and 17.

Anodes for the monolithic RLG are denoted by reference numerals 18–23. The path sections in which the anodes are positioned are preferably symmetrical with both the cathodes (as noted earlier) and the laser mode shape. Otherwise, the Langmuir flow induced bias cannot be balanced. This requirement is facilitated by the use of six mirrors having the same radius. Each beam path must be held constant in length, despite changes in temperature, acceleration, etc.

In operation of the monolithic RLG, each of the three beam paths 2, 5, 4, 6; 1, 5, 3, 6; and 1, 2, 3, 4 will encompass two counterrotating beams.

The plasma current in each of the component ring lasers may be individually adjusted by changing the voltage levels on the anodes 18–23, just as individually done in conventional single unit RLGs.

The abovedescribed three-axis gyro cluster 31 is fully described in the aforementioned U.S. patent application Ser. No. 368,797.

According to the present invention, as shown in FIG. 3, a gyro assembly 30 is provided wherein the three beam paths are held constant in length. Gyro assembly 30 includes the abovedescribed gyro cluster 31 and a controller 32. Cluster 31 includes a first gyro 101 having beam path 2546, a second gyro 102 having beam path 1536, and a third gyro 103 having beam path 1234.

Mirrors PLC 2, 3 and 5, which are pathlength control (PLC) transducers, are movable mirrors. Mirrors 1, 4 and 6 are fixed mirrors. Movable mirrors PLC 2, 3, 5, are adjusted automatically, as explained hereafter, in order to maintain constant the three pathlengths. Fixed mirrors 1, 4, 6 are output mirrors for detecting the frequency differences of the counter rotating laser beams.

As shown in FIG. 3, the controller 32 includes, a detector assembly 105, which connects to fixed mirrors 1, 4, 6, an input matrix assembly 106, and a high voltage amplifier assembly 107, which connects to movable mirrors PLC 2, 3, 5.

As shown in FIG. 1 and FIG. 3, the cube-shaped, three-axis gyro assembly 30 has a cube-shaped support structure 31, which has a reference x-axis, a reference y-axis, and a reference z-axis, that intersect at a common intersection point and that are disposed in quadrature.

The first movable mirror 2 and the first fixed mirror 4 are disposed along the x-axis and are equally spaced from the axis intersection point. The second movable mirror 3 and the second fixed mirror 1 are disposed along the Y-axis and are equally spaced from the axis intersection point. The third movable mirror 5 and the third fixed mirror 6 are disposed along the Z-axis and are equally spaced from the axis intersection point. The support structure 31 has the first four-sided passageway, in the plane of the X-axis and Z-axis, which is defined by corner mirrors 2, 5, 4 and 6, and which forms first gyro 101. The support structure 31 also has the second four-sided passageway, in the plane of the Y-axis and the Z-axis, which is defined by corner mirrors 1, 5, 3 and 6 and which forms second gyro 102. The support structure 31 also has the third four-sided passageway, in the plane of the X-axis and Y-axis, which is defined by corner mirrors 1, 2, 3 and 4 and which forms gyro 103.

Detector assembly 105, as shown in FIG. 3, includes power detectors 201, 202, 203, which respectively connect to fixed mirrors 1, 4, 6 of gyros 101, 102, 103, demodulators 204, 205, 206, which respectively connect to detectors 201, 202, 203, and oscillators 207, 208, 209, which respectively connect to demodulators 204, 205, 206.

Assembly 105 also has integrators 210, 211, 212, which respectively connect to demodulators 204, 205, 206, and summing junctions 213, 214, 215, which respectively connect to integrators 210, 211, 212.

Junctions 213, 214, 215 have respective output lines 216, 217, 218, which connect to input matrix assembly 106.

Gyro 101 connects, in series, through detector 201, which is also a beam combiner, demodulator 204, and integrator 210 to junction 213. Gyro 102 connects, in series, through detector 202, which is also a beam combiner, demodulator 205, and integrator 211 to junction 214. Gyro 103 connects, in series, through detector 203, which is also a beam combiner, demodulator 206, and integrator 212 to junction 215.

Oscillator 207 connects through a capacitor 219 to junction 213, and also connects to demodulator 204. Oscillator 208 connects through a capacitor 220 to junction 214, and also connects to demodulator 205. Oscillator 209 connects through a capacitor 221 to junction 215, and also connects to demodulator 206.

Input matrix assembly 106 includes a first network 313, a second network 314, and a third network 315. Network 313 has an output line 316, which connects to amplifier assembly 107. Network 314 has an output line 317, which connects to amplifier assembly 107. Network 315 has an output line 318, which connect to amplifier assembly 107.

Amplifier assembly 107 has an amplifier 413, which connects to line 316 and which has an output line 416, an amplifier 414, which connects to line 317 and which has an output line 417, and an amplifier 415, which connects to line 318 and which has an output line 418.

Output lines 416, 417, 418 connect respectively to movable mirrors, or pathlength controls (PLC) 2, 3, 5 as shown in FIG. 3.

In gyro cluster 31, the movable, or flexible, mirror, or pathlength control transducer (PLC) 2 has a housing 513, which connects to amplifier line 416, and pathlength control transducer (PLC) 3, which has a housing 514, which connects to amplifier line 417, and pathlength control transducer (PLC) 5, which has a housing 515, which connects to amplifier line 418.

The construction of housings 513, 514 and 515, which have respective actuators (not shown), is shown and described in U.S. Pat. Nos. 4, 160,184 and 4,267,478.

PLC 2 has a coupling effect 516 on path 2546 of gyro 101, and a coupling effect 519 on path 1234 of gyro 103.

PLC 3 has a coupling effect 517 on path 1536 of gyro 102, and a coupling effect 520 on path 1234 of gyro 103.

PLC 5 has a coupling effect 518 on path 2546 of gyro 101 and a coupling effect 521 on path 1536 of gyro 102.

These coupling effects on gyros 101, 102 and 103 are shown schematically by dash lines in FIG. 3.

In operation, each of the three pathlengths of gyros 101, 102, 103 must be held constant in length. The movable mirrors 2, 3, 5 are adjusted in order to adjust each of the lengths of the paths of gyros 101, 102, 103, as required.

For example, in order to shorten the length of path 2546 of gyro 101, there is a signal from gyro 101, passing, in series, through detector 201, demodulator 204, integrator 210, junction 213, and output line 216, which gives a positive signal at network 314 and negative signals at networks 313 and 315. Due to the coupling effects, as shown in FIG. 3, there are two negative effects 516, 518 at gyro 101, and a cancelling positive effect 517 and negative effect 521 at gyro 102, and a cancelling positive effect 520 and negative effect 519 at gyro 103. Thus, there is a net negative effect only at gyro 101 thereby shortening the length of path 2546 of gyro 101, but not changing the length of path 1536 of gyro 102, and not changing the length of path 1234 of gyro 103.

Figure 4:
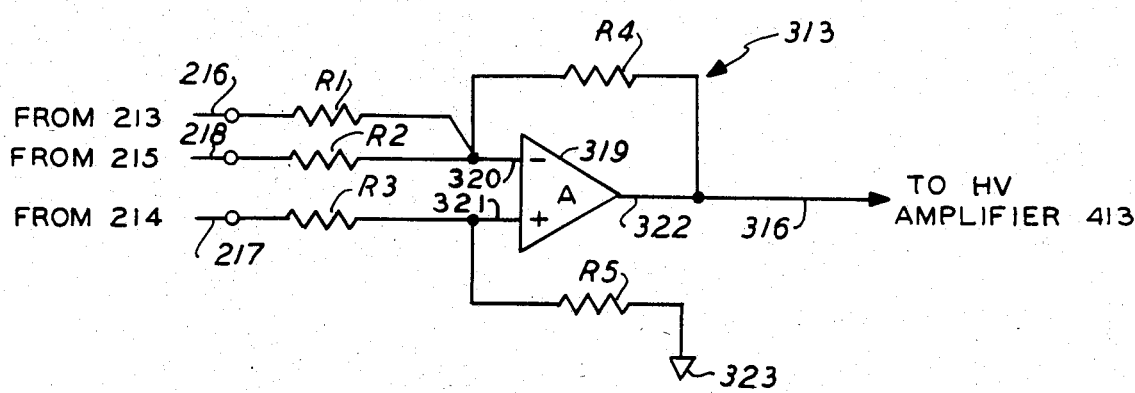
FIG. 4 is a detailed circuit diagram of one portion of the diagram of FIG. 3.

As shown in FIG. 4, typical network 313 includes resistor R1, which connects to line 216 from junction 213, resistor R2, which connects to line 218 from junction 215, and resistor R3, which connects to line 217 from junction 214.

Network 313 also includes an operational amplifier 319, which has a negative terminal 320, that connects to resistors R1 and R2, and a positive terminal 321, that connects to resistor R3. Network 313 also has an output terminal 322, which connects to output line 316 to high voltage amplifier 413.

A resistor R4 is connected between the terminals 320 and 322. Another resistor R5 is connected between the terminal 321 and a ground 323.

The resistors R1-R5 are identical so that the three networks 313, 314, 315, which are identical, comprise three sets of identical parts including a set of resistors R1-R5 and a set of amplifiers 319.

The operation of controller 32 is summarized hereafter. The coupling due to the geometry in the monolithic three axis RLG 31 is shown in FIG. 3 as dashed lines. As an example, when PLC 2 is pushed in, both RLG paths 2546 and 1234 have their pathlength shortened. The power in each RLG path is detected with power detector 201, 202 and 203. Such a power detector consists of a PIN-photo detector with preamplifier, attached such that part of the light inside the RLG that leaks through a mirror is intercepted by the diode. The signals from the power detectors 201, 202, 203 are demodulated by demodulators 204, 205, and 206. These are driven from the three oscillators 207, 208 and 209. Optionally, these three oscillators can be substituted for only one oscillator that drives all demodulators. The signal is integrated in integrators 210, 211 and 212. The AC signal from the oscillators, which typically is set to 2000 to 3000 Hz, is summed with the integrator outputs in summing junction 213, 214 and 215.

These signals, which consist of a DC signal with a small AC signal from the oscillator imposed on it, are routed to an input matrix networks 313, 314 and 315. The input matrix network 313 consists of a resistor network. Detailed network 313 is shown in FIG. 4. It consists of the operational amplifier A and five identical resistors R1-R5. The other two networks 314, 315 are identical to network 313.

The output on lines 316, 317, 318 from the input matrix networks 313, 314, 315 passes to high voltage amplifiers 413, 414 and 415, now again referring to FIG. 3. The output on lines 416, 417, 418 from these amplifiers 413, 414, 415 are connected to power control transducers PLC 2, 3 and 5.

With the construction according to this invention, there is provided a three-axis gyro assembly having three gyros with three movable mirrors and three fixed mirrors, and having a pathlength controller, which can change the pathlength of any one gyro but will not change the pathlengths of the other two gyros. Further, construction of the input matrix portion of the controller can be made of three sets of identical parts for ease of manufacture.

It should be understood that the invention is limited to the exact details of construction shown and described herein for obvious modifications will occur to persons skilled in the art.

What is claimed is:

1. A three axis gyro assembly including:
a support structure having an x-axis, a y-axis, and a z-axis intersecting at a point and disposed in quadrature;
first and second and third movable mirrors and first and second and third fixed mirrors supported by the support structure;
said first movable mirror and said first fixed mirror being disposed along the x-axis and equally spaced on either side of the intersection point;
said second movable mirror and said second fixed mirror being disposed along the y-axis and equally spaced on either side of the intersection point;
said third movable mirror and said third fixed mirror being disposed along the z-axis and equally spaced on either side of the intersection point;
first and second and third passageways of the support structure being respectively disposed in an x-plane and a y-plane and a z-plane, said x-plane and y-plane and z-plane being respectively normal to the x-axis and y-axis and z-axis.
each of said passageways having four corners formed by two of said movable mirrors and two of said fixed mirrors;
each of said passageways having anode means and cathode means forming first and second and third gyros; and
a pathlength controller for the three gyros, said controller comprising:
a detector assembly having first and second and third detector units respectively connecting to the first and second and third fixed mirrors and respectively adapted to measure an intensity modulation of its gyro beams, and
an input matix network assembly connecting to the detector assembly and connecting to the first and second and third movable mirrors,
whereby the pathlength of any one gyro can be changed in length without changing the pathlengths of the other two gyros, wherein said input matrix network assembly comprises:
a first network having an output line connecting through an amplifier to the first movable mirror;
a second network having an output line connecting through an amplifier to the second movable mirror; and
a third network having an output line connecting through an amplifier to the third movable mirror; and
wherein each of said first and second and third networks includes an operational amplifier, said amplifier comprising:
an output terminal connecting through a high voltage amplifier to its movable mirror;
a positive input terminal having a positive input line connecting through a resistor to the first of the other two detectors;
a negative input terminal having a first negative input line connecting through a resistor to the second of the other two detectors, and having a second negative input line connecting through a resistor to its own detector.

2. The gyro assembly of claim 1, wherein:
said positive input terminal connects through a resistor to a ground, and
said negative input terminal connects through a resistor to said output terminal.

3. The gyro assembly of claim 2, wherein:
each of said resistors in said network is identical to the other resistors in said network.

4. The gyro assembly of claim 1, wherein each of said first and second and third detector units includes:
a power detector connecting to its fixed mirror;
a demodulator connecting to the power detector;
an integrator connecting to the demodulator;
a summing junction connecting to the integrator;
an oscillator connecting to the demodulator and connecting through a capacitor to the summing junction; and
an output line from the summing junction connecting to the input matrix network.

5. A ring laser gyro assembly having three gyros for detecting inertial rotation in three axes, the gyro assembly comprising:
a three dimensional body;
mirrors, including first and second and third movable mirrors and first and second and third fixed output mirrors located on the faces of the body and positioned in symmetrical relation to one another;
passageways containing lasing gas and connecting each mirror to a preselected number of other mirrors to form optical cavities, each cavity having spaced mirrors connected thereto resulting in three mutually orthogonal planes intersecting the mirrors, each plane including an optical cavity orthogonal to the other optical cavities and forming three gyro paths;
means for suspending the body; and
pathlength controller means for detecting intensity modulation of the laser beams in each of the cavities, each such intensity modulation corresponding to a deviation in pathlength from the size determined by the center of the atomic transition frequency;
said pathlength controller connecting to the three fixed mirrors and the three movable mirrors, and adapted to automatically adjust the pathlength of any one gyro without changing the pathlengths of the other two gyros, said controller comprising:
a detector assembly having first and second and third detector units respectively connecting to the first and second and third fixed mirrors and respectively adapted to measure an intensity modulation of its gyro beams; and
an input matrix network assembly connecting to the detector assembly and connecting to the first and second and third movable mirrors,
whereby the pathlength of any one gyro can be changed in length without changing the pathlengths of the other two gyros,
wherein said input matrix network assembly comprises:
a first network having an output line connecting through an amplifier to the first movable mirror;
a second network having an output line connecting through an amplifier to the second movable mirror; and
a third network having an output line connecting through an amplifier to the third movable mirror, and
wherein each of said first and second and third networks includes an operational amplifier, said amplifier comprising:
an output terminal connecting through a high voltage amplifier to its movable mirror;
a positive input terminal having a positive input line connecting through a resistor to the first of the other two detectors;
a negative input terminal having a first negative input line connecting through a resistor to the second of the other two detectors, and having a second negative input line connecting through a resistor to its own detector.

6. The gyro assembly of claim 5, wherein each of said first and second and third detector units includes:
a power detector connecting to its fixed mirror;
a demodulator connecting to the power detector;
an integrator connecting to the demodulator;
a summing junction connecting to the integrator;
an oscillator connecting to the demodulator and connecting through a capacitor to the summing junction; and
an output line from the summing junction connecting to the input matrix network.

* * * * *